US008017926B2

(12) United States Patent
Norman et al.

(10) Patent No.: US 8,017,926 B2
(45) Date of Patent: Sep. 13, 2011

(54) RADIATION COLLIMATOR AND SYSTEMS INCORPORATING SAME

(75) Inventors: Daren R. Norman, Idaho Falls, ID (US); Woo Y. Yoon, Idaho Falls, ID (US); James L. Jones, Idaho Falls, ID (US); Kevin J. Haskell, Idaho Falls, ID (US); Brion D. Bennett, Idaho Falls, ID (US); Charles W. Tschaggeny, Woods Cross, UT (US); Warren F. Jones, Idaho Falls, ID (US)

(73) Assignee: Battelle Energy Allliance, LLC, Idaho Falls, ID (US)

( * ) Notice: Subject to any disclaimer, the term of this patent is extended or adjusted under 35 U.S.C. 154(b) by 200 days.

(21) Appl. No.: 12/248,737

(22) Filed: Oct. 9, 2008

(65) Prior Publication Data

US 2010/0091378 A1 Apr. 15, 2010

(51) Int. Cl.
*G01N 23/00* (2006.01)

(52) U.S. Cl. ............ 250/505.1; 378/56; 378/57; 378/58

(58) Field of Classification Search .................... 378/56, 378/57, 58; 250/505.1
See application file for complete search history.

(56) References Cited

U.S. PATENT DOCUMENTS 4,343,997 A 8/1982 Heinz
4,359,642 A 11/1982 Heinz et al.
4,880,985 A 11/1989 Jones
5,115,459 A 5/1992 Bertozzi
5,838,759 A 11/1998 Armistead
5,866,914 A * 2/1999 Jones ......................... 250/505.1
7,142,625 B2 11/2006 Jones et al.
7,508,909 B2 * 3/2009 Harmon et al. ................. 378/57
2005/0117683 A1 6/2005 Mishin et al.
2006/0140341 A1 6/2006 Carver et al.
2007/0245809 A1 * 10/2007 Harmon et al. ................... 73/52
2010/0091378 A1 * 4/2010 Norman et al. ............... 359/641

OTHER PUBLICATIONS

Jones et al., "Proof-of-Concept Assessment of a Photofission-Based Interrogation System for the Detection of Shielded Nuclear Material," INEEL/EXT-2000-01523, Nov. 2000, pp. 1-25.
Jones et al., "Pulsed Photonuclear Assessment (PPA) Technique: CY-05 Project Summary Report," INL/EXT-05-01020, Dec. 2005, pp. 1-33.
Jones et al., "Pulsed Photonuclear Assessment (PPA) Technology Enhancement Study," INL/EXT-06-11175, Apr. 2006, pp. 1-38.
"Photonuclear Inspection and Threat Assessment System," Idaho National Laboratory, before Sep. 2008, 4 pages.
Vega-Carillo et al., "Water-Extended Polyester Neutron Shield for a 252CF Neutron Source," Radiation Protection Dosimetry (2007), vol. 126, No. 1-4, pp. 269-273.
Norman et al., "PITAS Generation III System Design Report: The Developmental Prototype," INL/EXT-08-13798, Jan. 2008, pp. 1-37.
"Shielding Solutions for the 21st Century," Thermo Electron Corporation, Catalog 26, before 2007, pp. 1-13.
Norman et al., "Outdoor Photonuclear Testing for Nuclear Material Detection," Idaho National Laboratory, Aug. 1, 2007, 18 pages.
Norman et al., "Standoff Nuclear Material Imaging and Detection of Photonuclear-Induced Delayed Emissions," NSS/MIC—2007, Idaho National Laboratory, Oct. 30, 2007, 18 pages.

* cited by examiner

*Primary Examiner* — David A Vanore
(74) *Attorney, Agent, or Firm* — TraskBritt

(57) ABSTRACT

A collimator including a housing having disposed therein a shield element surrounding a converter core in which a photon beam is generated from electrons emanating from a linear accelerator. A beam channeler longitudinally adjacent the shield element has a beam aperture therethrough coaxially aligned with, and of the same diameter as, an exit bore of the converter core. A larger entry bore in the converter core is coaxial with, and longitudinally separated from, the exit bore thereof. Systems incorporating the collimator are also disclosed.

19 Claims, 5 Drawing Sheets

RADIATION COLLIMATOR AND SYSTEMS INCORPORATING SAME

CONTRACTUAL ORIGIN OF THE INVENTION

This invention was made with government support under Contract No. DE-AC07-05-1D14517 awarded by the United States Department of Energy. The government has certain rights in the invention.

TECHNICAL FIELD

The invention relates generally to linear accelerators, also termed "linacs," and collimators associated therewith. More specifically, embodiments of the invention relate to collimators for use in relatively high standoff applications, and to systems incorporating such collimators.

BACKGROUND

Various methods and devices have been proposed for inspecting containers for purposes of identifying contraband and other potentially harmful materials which may be used for terrorism or for other unlawful activities. Massive amounts of cargo are unloaded, and thereafter inspected for Customs or other regulatory purposes, at ports of entry to the United States. This inspection process is not without its shortcomings. It is well known that contraband has often slipped past inspectors and other government agents by being positioned or otherwise concealed within large, sealed shipping containers used to ship so-called "containerized freight," which can be offloaded onto tractor trailers, rendering detection of the contraband difficult, if not impossible, to uncover using conventional means. So-called "palletized" freight, wherein a large number of boxes or other objects are secured to transport pallets by strapping and shrink-wrapping with heavy plastic, present similar detection challenges. In addition to the foregoing, nuclear materials, even relatively small quantities of which could be effectively utilized in an explosive device in the form of a thermonuclear explosive or in a so-called "dirty bomb" wherein radioactive material is widely dispersed using conventional explosives, may be radiation-shielding and enclosed in a relatively small region of a large shipping container. Effective detection and identification of contraband, including concealed, shielded high-density nuclear material, therefore, is a priority at United States ports of entry. Similarly, effective airport security has become of grave concern, given the ease with which explosives may be hidden in both checked and carry-on baggage.

Systems for conducting detection of contraband, including both conventional explosives and nuclear materials, are known in the art. A number of these systems use directed beams of photons, which may also be characterized in non-technical terms as "X-rays," to generate a detector response to the presence of such undesirable materials, including radiation-shielded nuclear materials. See, for example, U.S. Pat. Nos. 5,115,459 and 5,838,759, and U.S. Patent Publications US2005/0117683, US2006/0140341, and US2007/0245809, the disclosure of each of which document is incorporated herein in its entirety by this reference. See also, for example, the following publications of the Idaho National Laboratory (INL) (formerly the Idaho National Engineering and Environmental Laboratory (INEEL)): "Proof-of-Concept Assessment of a Photofission-Based Interrogation System for the Detection of Shielded Nuclear Material," INEEL/EXT-2000-01523, November 2000; "Pulsed Photonuclear Assessment (PPA) Technique: CY-05 Project Summary Report," INL/

EXT-05-01020, December 2005; and Pulsed Photonuclear Assessment (PPA) Technology Enhancement Study, INL/EXT-06-11175, April 2006, the disclosure of each of which document is incorporated herein in its entirety by this reference. See, also, "PITAS Generation III System Design Report The Developmental Prototype," INL/EXT-08-13798, January 2008.

A significant disadvantage of conventional systems which may be used to detect nuclear material, including shielded nuclear material, is their inability to handle the sheer volume of cargo entering the United States. In particular, scanning freight as it is offloaded from transport vessels and prior to disposition on trucks for domestic transport is an overwhelming task, given the millions of units of containerized and palletized freight offloaded at U.S. ports each year. Given the objective of scanning all incoming foreign freight, even conducting a container-by-container scan is impractical from both cost and time standpoints. In addition, conducting the inspection process after the freight has reached port and in the presence of a large number of personnel presents small, but notable risks to property and human life.

As a result, it would be desirable to develop a detection system with the capability of scanning cargo vessels (such term including sea, air and land transport vessels) at a rapid rate and at considerable standoff distances. However, conventional photonuclear-based detection technology is unsuitable for detection at distances in excess of a few meters.

For example, it has been recognized by the inventors herein that the use of linacs to generate a photon beam using an electron source of relatively high energy, for example, and not by way of limitation, in the range of about 8 MeV to about 100 MeV in high-standoff field operations such as the aforementioned cargo vessel scanning applications, requires that off-axis (e.g., diverging from the main radiation beam path) radiation doses be minimized. In addition to controlling off-axis radiation, the inventors have recognized that it is desirable to have substantially only high-energy photons on the beam axis, to limit the radiation dose while maximizing photonuclear stimulation of a shielded nuclear target material at substantial standoff distances.

While near-field use of a photon beam to generate a response from a target material can be effective inside a shielded cell with adequate off-axis dose controls, field operations with much larger standoff distances, on the order of hundreds of meters, are not susceptible to the use of such traditional methods.

Further, a major contributor in the use of conventional linac systems to an on-axis radiation dose to a targeted inspection area is from low energy photons from the bremsstrahlung process used to generate the photon beam, and such low energy photons do not provide the desired photonuclear signature from the target material.

BRIEF SUMMARY

One embodiment of the invention comprises a collimator including a housing having disposed therein a shield element surrounding a converter core in which a photon beam is generated. The shield element may protrude longitudinally forward of the converter core to overlap a beam channeler, which includes a beam aperture therethrough coaxially aligned with, and of the same diameter as, an exit bore of the converter core. A larger entry bore in the converter core is coaxial with, and longitudinally separated from, the exit bore thereof. In this embodiment, the housing may comprise neutron and photon shielding materials such as Water-Extended Polyester (WEP) or ENVIRO-SHIELD™ material, while the shield element and the beam channeler may each comprise one or more of aluminum, tungsten, lead or graphite, and the converter core may comprise aluminum.

Another embodiment of the invention comprises a collimator including a housing having disposed therein a shield element surrounding a converter core in which a photon beam is generated. The shield element may protrude longitudinally forward of the converter core to abut an end of a beam channeler, which includes an aperture therethrough coaxially aligned with, and of the same diameter as, an exit bore of the converter core. A larger entry bore in the converter core is coaxial with, and longitudinally separated from, the exit bore thereof. In this embodiment, the housing comprises a Water-Extended Polyester (WEP) material, the shield element and the beam channeler each may comprise aluminum, lead or tungsten, and the converter core comprises aluminum. Tubing, such as aluminum or stainless steel, is placed in the beam channeler aperture and into the exit bore of the converter core to define a beam aperture.

Another embodiment comprises a linear accelerator comprising a collimator according to an embodiment of the invention.

A further embodiment comprises a detection system for shielded nuclear material configured for high-standoff field operations and incorporating a collimator according to an embodiment of the present invention.

DETAILED DESCRIPTION

Figure 1:
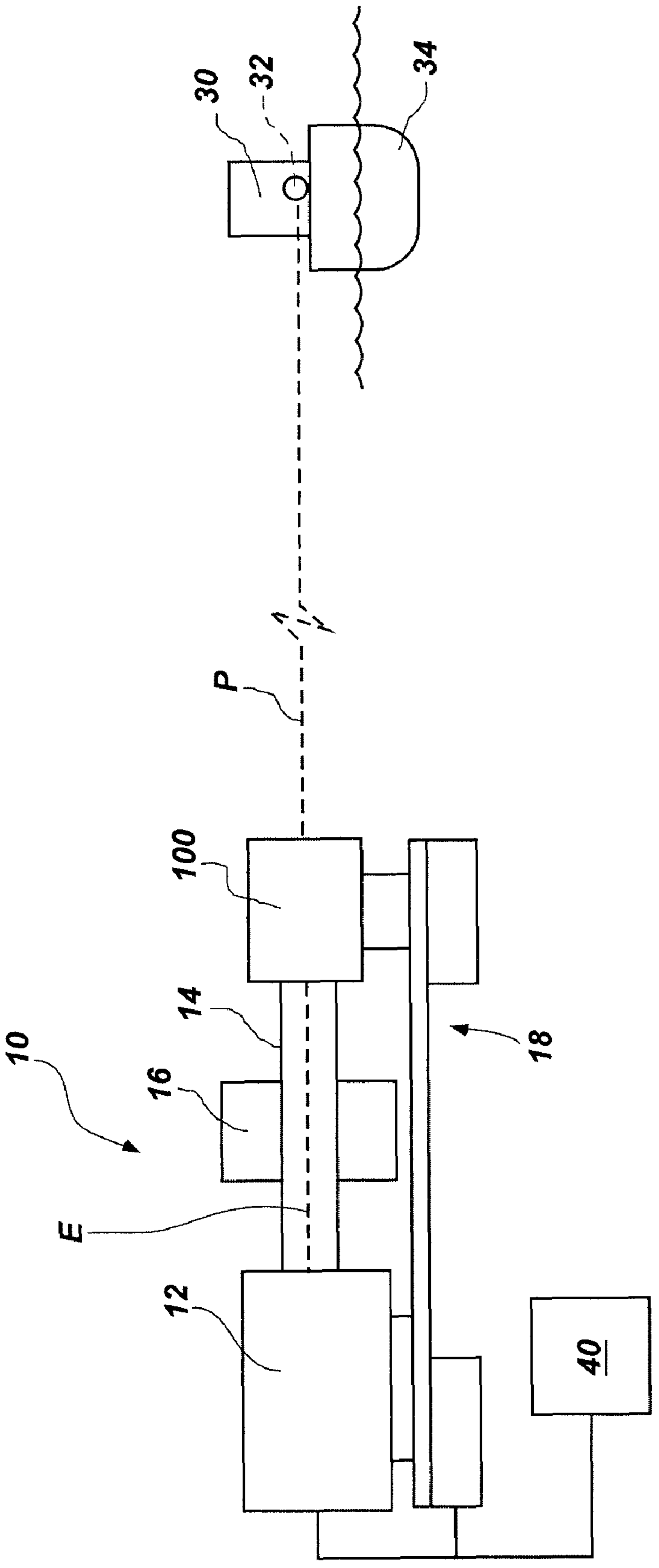
FIG. 1 is a schematic of a linear accelerator system configured for field operations and incorporating an embodiment of a collimator according to the invention.

In the description which follows, the same or similar elements are identified by like reference numerals for clarity.

FIG. 1 depicts schematically a linear accelerator system 10 comprising an accelerating waveguide 12 for creating and injecting a burst of electrons at a relatively high energy level, by way of non-limiting example, about 8 MeV to about 30 MeV, and injecting the electrons E into a central vacuum tube 14 which runs from the accelerating waveguide 12 to a collimator 100 according to an embodiment of the invention, as further described below. As the electrons E are being injected into the central vacuum tube 14 from the accelerating waveguide 12, a klystron 16 generates a finely tuned radiofrequency that meets the electrons E in the accelerating waveguide 12, and accelerates them to a high rate of speed necessary for nuclear materials inspection. One the electrons are inside the collimator 100, they are used to generate high-energy photons, which may also be characterized as X-rays. Excess photo-neutrons and the resulting neutron absorption gamma rays generated in the conversion process are absorbed by the collimator 100, the end result being a bremsstrahlung radiation process. Collimator 100 then only allows the energy beam of photons P that are generated in the forward direction through a small beam aperture, which is aimed in the direction of a container 30 on cargo vessel 34 to be scanned for shielded nuclear material 32. Linear accelerator system 10 may be mounted on a targeting platform 18 on which accelerating waveguide 12, central vacuum tube 14, klystron 16 and collimator 100 are supported. Targeting platform 18 comprises a lift and yaw mechanism configured for raising, lowering and directing side-to-side motion of the supported components to track a container 30 while it is in motion on, for example, a cargo vessel 34 under the direction of a controller 40, which may comprise a suitably programmed personal computer and which also controls linear accelerator system 10. Lift may be provided hydraulically, while yaw may be electronically controlled. Of course, other drive technologies for targeting platform 18, such as magnetic and pneumatic, may be employed. While only one container 30 has been depicted, it is understood that hundreds of containers, pallets or other freight on a cargo vessel may be scanned when the vessel is in targeting proximity to the linear accelerator system 10. Operation of a detection system including linear accelerator system 10 with associated targeting platform 18 and controller 40 will be described below in conjunction with FIG. 5.

Figure 2A:
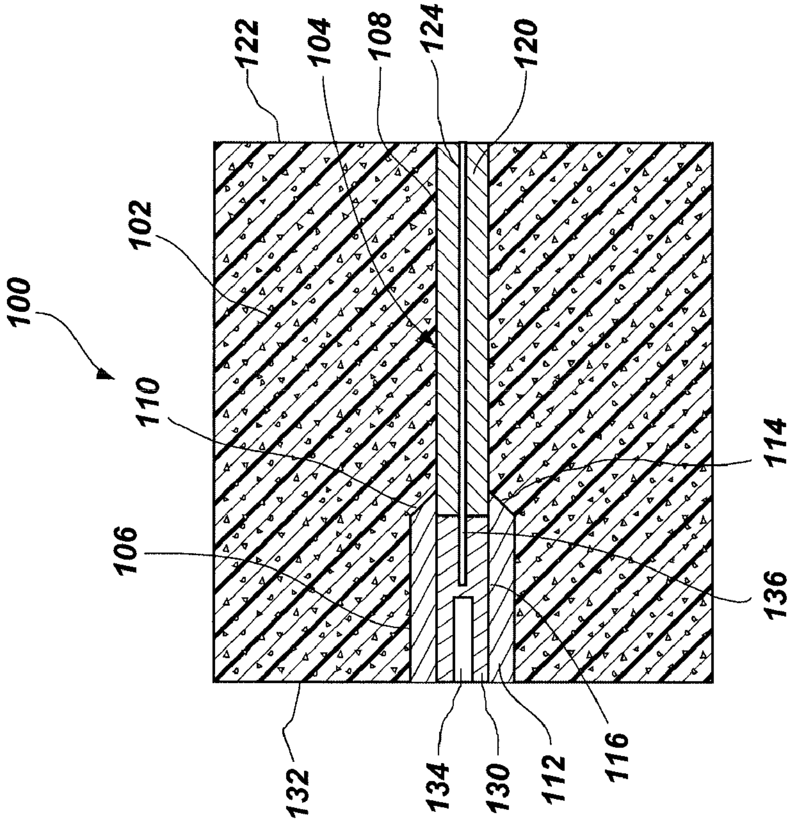
FIG. 2A is a side sectional view of the collimator of FIG. 2, taken along section line A-A.
Figure 2:
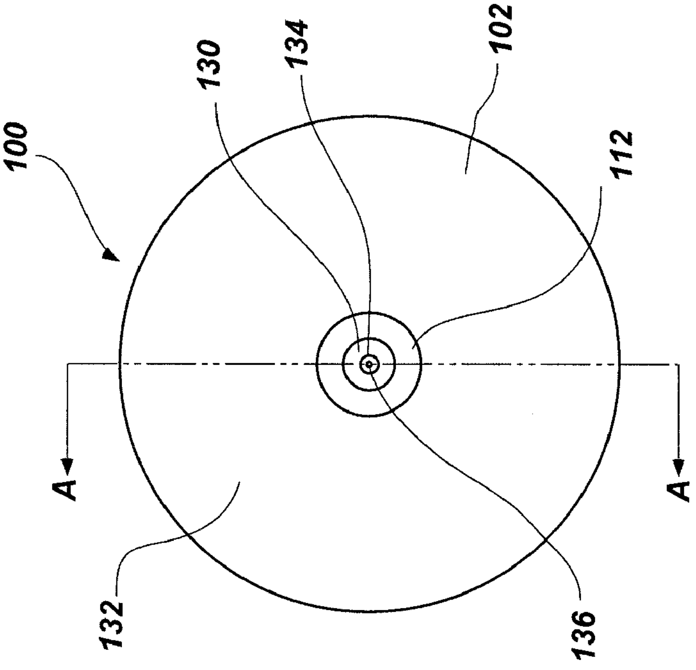
FIG. 2 is an end view of an embodiment of a collimator according to an embodiment of the invention.

FIGS. 2 and 2A illustrate, respectively, end and side sectional views of an embodiment of a collimator 100 according to the invention. Collimator 100 comprises an outer housing 102 configured as a thick-walled, substantially cylindrical barrel having a stepped axial bore 104 therethrough, bore 104 comprising cylindrical bore segment 106 of a first diameter terminating at a cylindrical bore segment 108 of a second, smaller diameter, frustoconical transition bore segment 110 joining first and second bore segments 106, 108. Housing 102 may comprise, by way of non-limiting example, ENVIRO-SHIELD™ material, offered by the Thermo Reax operating unit, Santa Fe, N. Mex., of Thermo Electron Corporation. ENVIRO-SHIELD™ material is a homogeneous mixture of lead substitute elements in an inert polymer, polyethylene, at a typical density of 3 g/cc.

Disposed within bore 104 of housing 102 is substantially cylindrical shield element 112, which is substantially tubular, of an outer diameter slightly smaller than that of bore segment 106 and which includes a frustoconical forward surface 114 protruding into the portion of bore 104 bounded by frustoconical transition bore segment 110 and abutting the wall of the latter. Shield element 112 includes axial bore 116 therethrough, of substantially the same diameter as that portion of bore 104 bounded by second bore segment 108. Shield element 112 may, for example, comprise tungsten or lead, while the portion thereof proximate axial bore 116 may, for example, contain aluminum. It is contemplated that graphite may also be employed in shield element 112.

Beam channeler 120 is substantially cylindrical, of an outer diameter slightly smaller than that of axial bore 116 of shield element 112 and second bore segment 108 of housing 102. Beam channeler 120 extends from within the portion of axial bore 116 of shield element 112 longitudinally contiguous with frustoconical forward surface 114 thereof through second bore segment 108 to longitudinal end 122 of housing 102. Beam aperture 124 extends coaxially through beam channeler 120 from one end thereof to the opposing end. Beam channeler 120 may, for example, comprise one or more of tungsten, lead, aluminum and graphite.

Substantially cylindrical converter core 130 of slightly smaller diameter than that of axial bore 116 of shield element 112 is disposed within axial bore 116 in longitudinally abutting relationship to beam channeler 120, and extends longitudinally to longitudinal end 132 of housing 102. Blind entry bore 134 of converter core 130 extends from longitudinal end 132 of housing 102 inwardly. Blind exit bore 136 of converter core 130 is longitudinally spaced from, and coaxial with, blind entry bore 134, and blind exit bore 136 is of the same diameter as that of beam aperture 124, with which it is also coaxial. The beam aperture diameter is determined responsive to the electron beam diameter as it enters the converter core 130. Converter core 130 may, for example, comprise aluminum and the desired thickness thereof may be determined based on nuclear material response at anticipated, long standoff distances. Blind entry bore 134 allows the central vacuum tube 14 (FIG. 1) to protrude into the collimator 100, while providing some aluminum between the converter core 130 and the surrounding shield element 112 of a high-Z material (such as lead or tungsten).

The aluminum converter core 130, a low-Z material, may be employed as the electron-to-photon converter in linear accelerator 10, and as an inner collimator for the generated photons. Shield element 112, for example, of tungsten, a high-Z material, is employed to contain the generated high-energy photons. The tungsten of beam channeler 120 likewise substantially contains off-axis high-energy photons, so that a directed, narrow beam of high-energy photons is emitted through beam aperture 124, the lower energy bremsstrahlung photons being contained within beam channeler 120. The beam aperture size, as noted above, is determined with respect to the electron beam diameter as it enters the converter core 130. The electron beam diameter may be, as one non-limiting example, about 5 mm. The ENVIRO-SHIELD™ material provides gamma ray shielding, thermal neutron shielding and fast neutron thermalizing during the electron-to-photon conversion process.

The aluminum and tungsten materials employed in collimator 100 may be commercially available alloys, and do not require optimization for effective operation of collimator 100, although optimization may provide additional, incremental functional benefits.

Figure 3A:
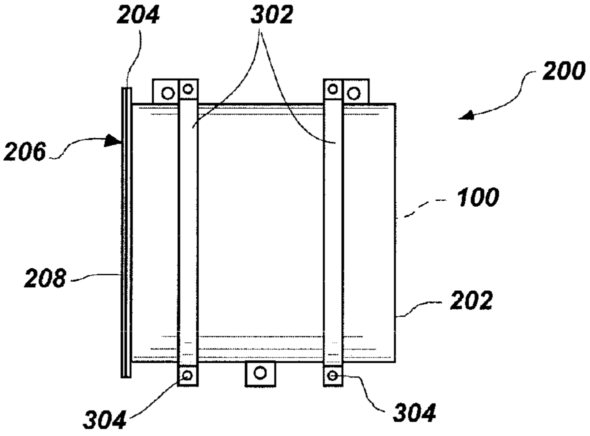
FIGS. 3A, 3B and 3C are, respectively, a top, side and end view of a collimator assembly according to an embodiment of the invention.
Figure 3B:
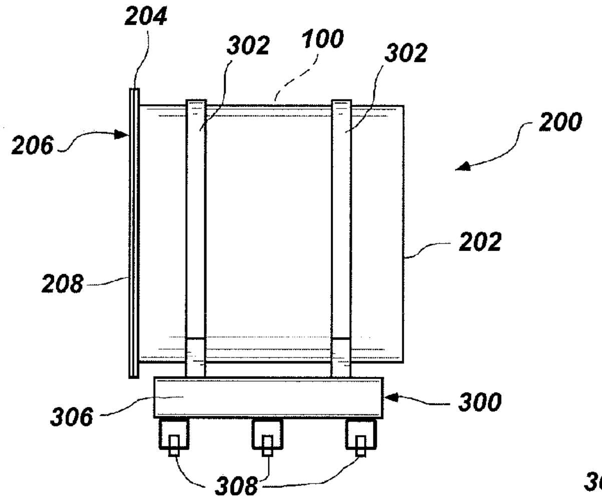
Figure 3C:
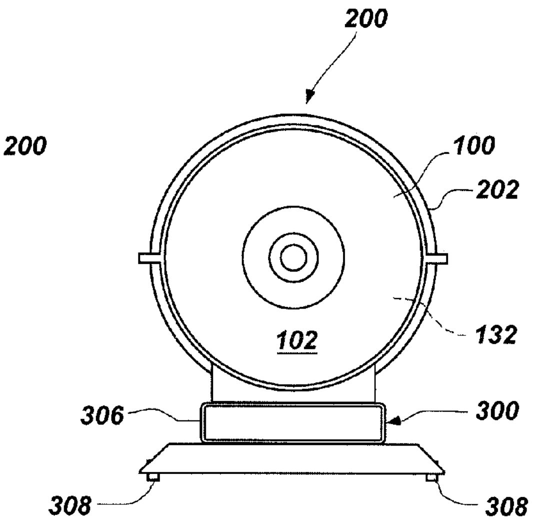

FIGS. 3A through 3C depict an embodiment of a collimator assembly 200 comprising an embodiment of a collimator according to the present invention, and which may be employed in a linear accelerator 10 (FIG. 1). Collimator assembly 200 comprises a relatively thin-walled housing 202 of substantially cylindrical shape, formed of steel and having an annular flange 204 at one longitudinal end 206 thereof. End plate 208 is secured to flange 204 at the periphery of housing 202 by fasteners (not visible), and includes a central aperture therethrough (not shown) aligned with beam aperture 124 (not visible). Collimator 100 is disposed within a bore of housing 202, the bore being of slightly larger diameter than the exterior diameter of housing 102. The longitudinal end 132 of housing 102 is located at the longitudinal end 206 of housing 202 having annular flange 204 protruding therefrom. Housing 202, with collimator 100 disposed therein, is secured to carriage 300 with circumferential straps 302 extending about the exterior of housing 202 and affixed to carriage 300 with fasteners 304, as known in the art. Base 306 of carriage 300 rests on feet 308. In lieu of the use of straps 302, carriage 300 may be configured with a half-cylindrical cradle (not shown) in which the housing 202 rests.

Figure 4:
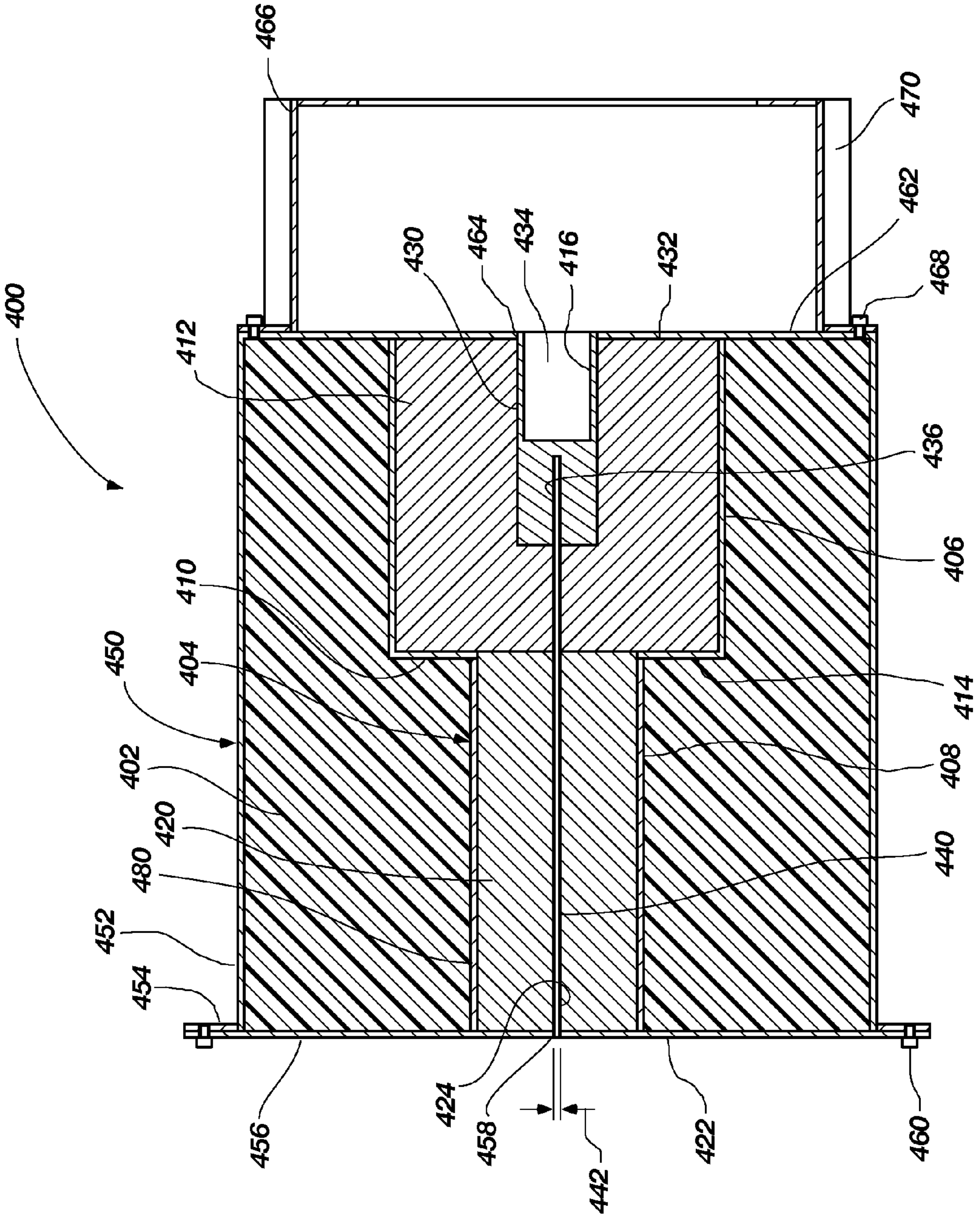
FIG. 4 is a side sectional view of another embodiment of a collimator according to an embodiment of the invention.

FIG. 4 illustrates a side sectional view of another embodiment of a collimator 400 according to the invention. Collimator 400 comprises an outer housing 402 configured as a thick-walled, substantially cylindrical barrel having a stepped axial bore 404 therethrough, bore 404 comprising cylindrical bore segment 406 of a first diameter axially terminating at a cylindrical bore segment 408 of a second, smaller diameter, radially extending bore wall 410 joining first and second bore segments 406, 408. Outer housing 402 may comprise, by way of non-limiting example, a Water-Extended Polyester (WEP). Properties of WEP are described in Vega-Carillo et al., "Water-Extended Polyester Neutron Shield for a $^{252}$CF Neutron Source," Radiation Protection Dosimetry (2007), vol. 126, Nos. 1-4, pp. 269, 273, the disclosure of which document is incorporated herein in its entirety by reference.

Disposed within bore 404 of outer housing 402 is a substantially cylindrical shield element 412, which is substantially tubular, of an outer diameter slightly smaller than that of bore segment 406 and which includes a radially extending, flat forward surface 414 proximate bore wall 410. Shield element 412 includes axial bore 416 therethrough, of a smaller diameter than that portion of axial bore 404 bounded by bore segment 408. Shield element 412 may, for example, comprise one or more of lead, tungsten and aluminum. The use of graphite is also contemplated.

Beam channeler 420 is substantially cylindrical, of an outer diameter larger than that of axial bore 416 of shield element 412 and smaller than the outer diameter of shield element 412. Beam channeler 420 abuts flat forward surface 414 of shield element 412 and extends through bore segment 408 to longitudinal end 422 of housing 402. Aperture 424 extends coaxially through beam channeler 420 from one end thereof to the opposing end. Beam channeler 420 may, for example, comprise one or more of lead, tungsten, aluminum and graphite.

Shield element 412 and beam channeler 420 are separated from outer housing 402 by steel casing 480, which may comprise a stainless steel.

Substantially cylindrical converter core 430 of slightly smaller diameter than that of axial bore 416 of shield element 412 is disposed within axial bore 416 in longitudinally abutting relationship to a portion of shield element 412 and extends longitudinally to longitudinal end 432 of housing 402. Blind entry bore 434 of converter core 430 extends from longitudinal end 432 of housing 402 inwardly. Exit bore 436 of converter core 430 is longitudinally spaced from, and coaxial with, blind entry bore 434, and is of the same diameter as that of aperture 424 of beam channeler 420, with which it is also coaxial. Converter core 430 may, for example, comprise aluminum.

Tubular beam aperture liner 440 is disposed within aperture 424 of beam channeler 420 and exit bore 436 of converter core 430, and defines beam aperture 442 therethrough. Beam aperture liner 440 may, for example, comprise aluminum or stainless steel.

The aluminum converter core 430, a low-Z material, may be employed as the electron-to-photon converter in linear accelerator 10 (FIG. 1), and as an inner collimator for the generated photons. Shield element 412, for example, of lead, a high-Z material, is employed to contain the generated high-energy photons. The lead of beam channeler 420 likewise substantially contains off-axis high-energy photons, so that a directed, narrow beam of high-energy photons is emitted through beam aperture 424, the lower energy bremsstrahlung photons being contained within beam channeler 420. The WEP material provides gamma ray shielding, thermal neutron shielding and fast neutron thermalizing during the electron-to-photon conversion process.

The aluminum and lead materials employed in collimator 400 may be commercially available alloys, and do not require optimization for effective operation of collimator 400, although optimization may provide additional, incremental functional benefits.

Outer housing 402 may be disposed within a steel canister 450, which may comprise stainless steel components, comprising tubular barrel 452 having annular flange 454 at an open end thereof, radially flat end face 456 having central aperture 458 therethrough in alignment with beam aperture 442 and being secured to annular flange 454 by fasteners 460. An opposing end of steel canister 450 comprises integral end face 462 having a central aperture 464 therethrough aligned with entry bore 434 of converter core 430, the outer end of converter core 430 protruding through central aperture 464. Converter core 430 may be secured at its protruding portion to end face 462 by, for example, a silver solder.

A steel shell frame 466, which may comprise a stainless steel, may be secured, as by fasteners 468, to end face 462. Outer shielding 470 may radially surround steel shell frame 466. Outer shielding 470 may comprise, for example, borated HDPE (high-density polyethylene).

While not illustrated with respect to the embodiment of FIGS. 2 and 2A, it is contemplated that a steel canister may used to contain collimator 100, and that a steel shell with outer shielding as described in the preceding paragraph may be secured thereto.

Figure 5:
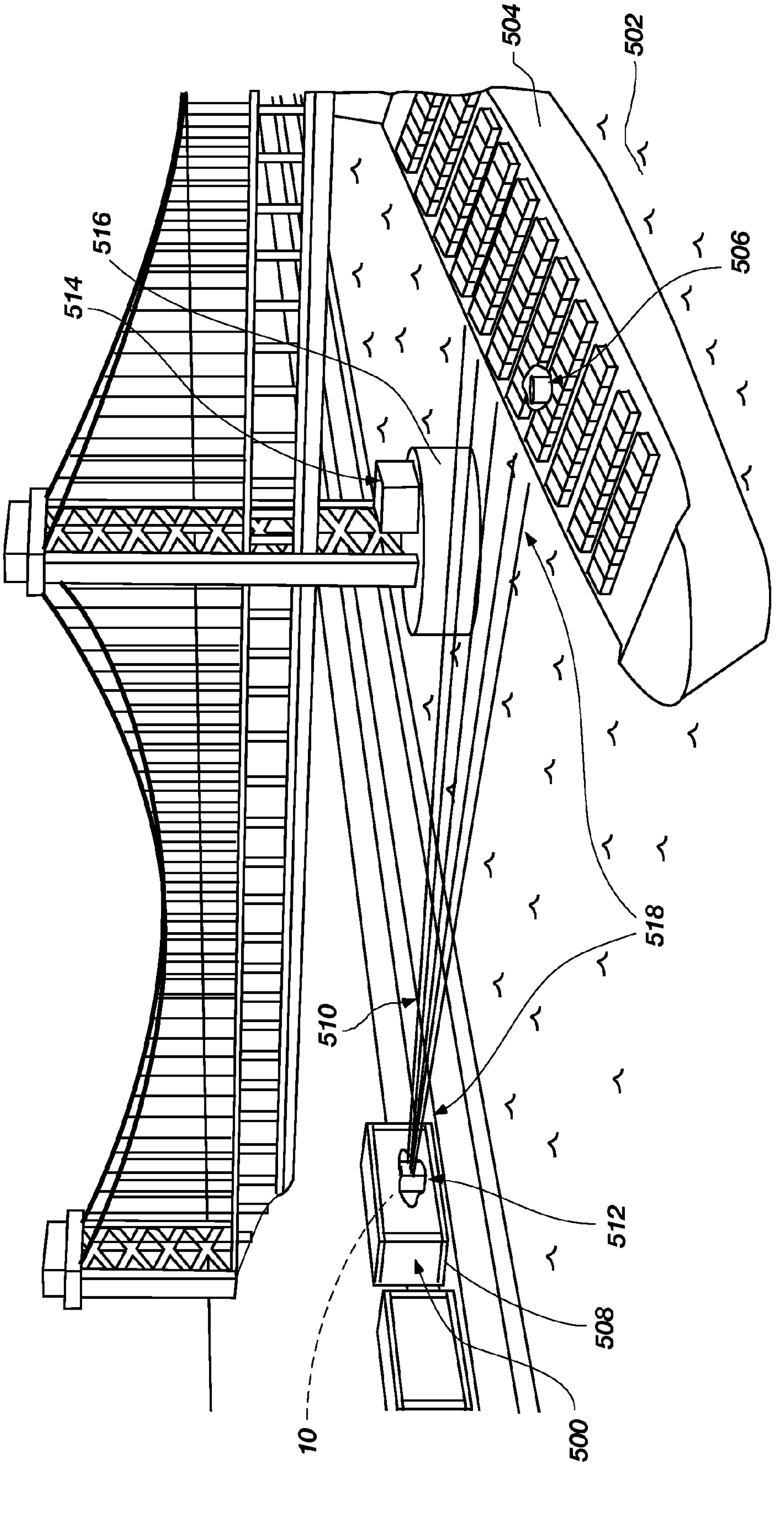
FIG. 5 pictorially depicts a photonuclear detection system incorporating a linear accelerator and a collimator according to an embodiment of the invention deployed adjacent a ship channel and scanning a cargo vessel.

FIG. 5 pictorially depicts a nuclear material detection system 500 deployed adjacent a ship channel 502 and in the process of scanning a cargo vessel 504 for shielded nuclear material 506. Nuclear material detection system 500 includes a linear accelerator system 10 comprising an embodiment of a collimator 100 (not shown) of the invention, the assembly being disposed for protection from the environment with an enclosure 508. Beam 510 is traversed as cargo vessel 504 proceeds up ship channel 502 toward a port for offloading its cargo. Shielded nuclear material 506, upon fission therein induced by photons of beam 510, emits neutrons and gamma rays, which may be detected by detectors 512 housed in enclosure 508 or detectors 514 remotely placed, by way of non-limiting example, on bridge pier 516. Detectors 512 and 514 may comprise, for example, detectors as disclosed and claimed in U.S. Pat. No. 7,142,625, assigned to the assignee of the present invention and the disclosure of which patent is incorporated in its entirety herein by reference. As shown, nuclear material detection system 500 enables an extremely high standoff 518 between linear accelerator 10 and cargo vessel 504. Thus, materials presenting radiological dangers such as, for example, plutonium, uranium and thorium, can be distinguished from simple medical or household items which often yield false positive alarms at unacceptable time delays when conventional detection technology is employed. The time-dependent nature of gamma and neutron signatures from illicit radiological materials enables such discrimination.

In the detection system of the present invention, operational factors such as, for example, quantity of nuclear material, distance to radioactive source and the electron beam energy of the linear accelerator result in detection times ranging from several seconds to about two minutes. Any radioactivity resulting around the inspected, target object is generally immeasurable and, if not, has no detrimental effects on the surrounding environment due to the very short duration of the inspection time.

The nuclear material detection system as described herein may be operated using remote Ethernet transmission, and may be powered by a single gasoline or diesel generator, enabling operation in any environment.

Embodiments of collimators according to the present invention maintain a capability of high-energy photon stimulation of shielded nuclear material at high standoff distances at least equivalent to that achievable using a high-Z (tungsten) converter core, while minimizing radiation dosages to less than 5 mrem/h as close as ten meters to the converter core and at a 45° angle to the axis of the high-energy photon beam, while simultaneously maintaining a reasonable collimator weight, such as less than 1,500 pounds and a reasonable footprint size of less than two feet square.

Embodiments of the collimator provide a "beam hardening" effect due to the use of collimation, rather than filtering, of the photon beam. This provides more of a "thin target"-like photon distribution rather than a conventional bremsstrahlung "thick target" photon distribution, in combination with minimizing neutron production, minimization of activation of the converter core and surrounding materials and, as noted above, maintaining the nuclear material response at long distances. The section of the target is significant, based on photonuclear thresholds and yields and activations from the photonuclear production.

Electron linear accelerators such as employed with the present invention generally provide monoenergetic electrons. As these electrons give up energy, they have a certain probability for any energy between zero and to the end point energy of the beam, for example, in the case of the described embodiment up to about 30 MeV. Thus, if an electron generates a 30 MeV photon, the electron has no more kinetic energy and the electron travels to an electrical ground through conventional electrical means. However, if the electron gives up only a fraction of its total energy (which is generally the case), it will change direction and all additional energy releases are outside the collimator aperture. Since the additional energy releases after the first interaction occur after the first scatter and outside the collimator aperture, the forward spectrum looks like a "thin-target" (single scatter thickness) while having thickness much greater than a "thin-target," and thus increases the high-energy photon production.

While the invention is susceptible to various modifications and alternative forms, specific embodiments of which have been shown by way of example in the drawings and have been described in detail herein, it should be understood that the invention is not limited to the particular forms disclosed. Rather, the invention includes all modifications, equivalents, and alternatives falling within the scope of the invention as defined by the following appended claims and their legal equivalents.

The invention claimed is:

1. A collimator for use with a linear accelerator, comprising:

an outer housing having a longitudinal bore therethrough including a segment of a diameter and another segment of a larger diameter;

a shield element disposed substantially within the another segment of the longitudinal bore and comprising a bore coaxial with the longitudinal bore and extending to an exterior of the outer housing at one longitudinal end thereof;

a converter core disposed in the bore of the shield element and comprising a blind entry bore coaxial with the longitudinal bore and extending to the exterior of the outer housing, and a blind exit bore coaxial with and longitudinally separated from the blind entry bore of the converter core and of a smaller diameter; and a beam channeler disposed substantially within the segment of the longitudinal bore and having an aperture therethrough encompassing a beam aperture coaxially aligned with, and of substantially the same diameter as, the blind exit bore of the converter core, the beam channeler extending from the blind exit bore to an exterior of the outer housing at another longitudinal end thereof opposing the one longitudinal end.

2. The collimator of claim 1, wherein the outer housing is substantially cylindrical and comprises a material selected from the group consisting of a material comprising a homogeneous mixture of lead substitute elements in polyethylene, and a Water-Extended Polyester (WEP).

3. The collimator of claim 1, wherein the shield element comprises one or more materials selected from the group consisting of lead, tungsten, aluminum and graphite.

4. The collimator of claim 3, further comprising a steel casing element disposed between the outer housing and the shield element.

5. The collimator of claim 1, wherein the beam channeler comprises one or more materials selected from the group consisting of lead, tungsten, aluminum and graphite.

6. The collimator of claim 5, further comprising a steel casing element disposed between the outer housing and the beam channeler.

7. The collimator of claim 5, further comprising a tubular beam aperture liner extending through the beam aperture of the beam channeler and the blind exit bore of the converter core.

8. The collimator of claim 7, wherein the tubular beam aperture liner comprises aluminum.

9. The collimator of claim 1, wherein the converter core comprises aluminum.

10. The collimator of claim 1, wherein the beam channeler longitudinally abuts an inner end of the shield element and the bore of the shield element comprises a blind bore.

11. The collimator of claim 1, wherein the converter core and the beam channeler are each cylindrical and of substantially the same outer diameter, an inner end of the beam channeler longitudinally abuts the converter core and an inner end of the shield element extends over an exterior of the beam channeler.

12. The collimator of claim 11, wherein the inner end of the shield element comprises a frustoconical outer surface tapering inwardly to proximate an exterior of the beam channeler.

13. The collimator of claim 1, further comprising a steel casing in which the outer housing is substantially disposed.

14. A system, comprising:

a linear accelerator configured to produce a stream of electrons along a longitudinal axis;

a collimator aligned to receive the stream of electrons along the longitudinal axis and generate a directed beam substantially comprising high-energy photons responsive to the stream of electrons, the collimator comprising:

an outer housing having a longitudinal bore therethrough including a segment of a diameter and another segment of a larger diameter;

a shield element disposed substantially within the another segment of the longitudinal bore and comprising a bore coaxial with the longitudinal bore and extending to an exterior of the outer housing at one longitudinal end thereof;

a converter core disposed in the bore of the shield element and comprising a blind entry bore coaxial with the longitudinal bore and extending to the exterior of the outer housing, and a blind exit bore coaxial with and longitudinally separated from the blind entry bore of the converter core and of a smaller diameter; and a beam channeler disposed substantially within the segment of the longitudinal bore and having an aperture therethrough encompassing a beam aperture coaxially aligned with, and of substantially the same diameter as, the blind exit bore of the converter core, the beam channeler extending from the blind exit bore to an exterior of the outer housing at another longitudinal end thereof opposing the one longitudinal end.

15. The system of claim 14, wherein:

the outer housing is substantially cylindrical and comprises a material selected from the group consisting of a material comprising a homogeneous mixture of lead substitute elements in polyethylene and a Water-Extended Polyester (WEP);

the shield element and the beam channeler each comprise one or more materials selected from the group consisting of lead, tungsten, aluminum and graphite; and the converter core comprises aluminum.

16. The system of claim 15, further comprising a tubular beam aperture liner comprising aluminum and extending through the beam aperture of the beam channeler and the blind exit bore of the converter core.

17. The system of claim 14, wherein the system further comprises a targeting platform supporting the linear accelerator and configured for raising, lowering and providing side-to-side motion of the linear accelerator.

18. The system of claim 17, further comprising a controller for directing the targeting platform in the raising, lowering and side-to-side motion of the linear accelerator.

19. The system of claim 18, further comprising at least one detector located remote from the linear accelerator for detecting gamma rays emitted by a shielded nuclear material remote from both the linear accelerator and the at least one detector in a photonuclear reaction responsive to contact therewith by the high-energy photons.

* * * * *